United States Patent
Gao et al.

(10) Patent No.: US 11,694,646 B2
(45) Date of Patent: Jul. 4, 2023

(54) DISPLAY PANEL HAVING OPENING IN FIRST ELECTRODE AND DISPLAY DEVICE THEREOF

(71) Applicant: SHENZHEN CHINA STAR OPTOELECTRONICS SEMICONDUCTOR TECHNOLOGY CO., LTD., Guangdong (CN)

(72) Inventors: Yanan Gao, Guangdong (CN); Llgon Kim, Guangdong (CN); Bin Zhao, Guangdong (CN); Xin Zhang, Guangdong (CN); Jun Zhao, Guangdong (CN)

(73) Assignee: SHENZHEN CHINA STAR OPTOELECTRONICS SEMICONDUCTOR DISPLAY TECHNOLOGY CO., LTD., Shenzhen (CN)

(*) Notice: Subject to any disclaimer, the term of this patent is extended or adjusted under 35 U.S.C. 154(b) by 224 days.

(21) Appl. No.: 16/770,412

(22) PCT Filed: Apr. 22, 2020

(86) PCT No.: PCT/CN2020/086106
§ 371 (c)(1),
(2) Date: Jun. 5, 2020

(87) PCT Pub. No.: WO2021/189581
PCT Pub. Date: Sep. 30, 2021

(65) Prior Publication Data
US 2022/0114980 A1    Apr. 14, 2022

(30) Foreign Application Priority Data
Mar. 22, 2020 (CN) .......................... 202010204838.8

(51) Int. Cl.
G09G 3/36      (2006.01)
G02F 1/1335    (2006.01)
(Continued)

(52) U.S. Cl.
CPC ....... G09G 3/3674 (2013.01); G02F 1/13454 (2013.01); G02F 1/133514 (2013.01);
(Continued)

(58) Field of Classification Search
CPC ......... G09G 3/3674; G09G 2300/0408; G09G 2300/0426; G02F 1/133514; G02F 1/134309; G02F 1/13454
See application file for complete search history.

(56) References Cited

U.S. PATENT DOCUMENTS 7,692,740 B2    4/2010  Doi et al.
2015/0070616 A1*  3/2015  Ogasawara ........... G02F 1/1339
                                                349/43
(Continued)

FOREIGN PATENT DOCUMENTS

CN    1945839 A      4/2007
CN    103472606 A   12/2013
(Continued)

*Primary Examiner* — Sanghyuk Park
(74) *Attorney, Agent, or Firm* — Dickinson Wright PLLC

(57) ABSTRACT

The present application provides a display panel. The display panel includes: gate driver on array (GOA) units arranged along a first direction; clock signal lines arranged along a second direction and arranged at one side of the GOA units; the connection lines, each of the connection lines being extended along the second direction and connected between the corresponding clock signal line and the corresponding GOA units; and a first electrode arranged at one side of the GOA units, the clock signal lines, and the connection lines. The first electrode includes an opening, and the opening is arranged corresponding to at least one of
(Continued)

the clock signal lines and/or at least one of the connection lines.

7 Claims, 7 Drawing Sheets

(51) Int. Cl.
    *G02F 1/1343*     (2006.01)
    *G02F 1/1345*     (2006.01)
(52) U.S. Cl.
    CPC .................. *G02F 1/134309* (2013.01); *G09G 2300/0408* (2013.01); *G09G 2300/0426* (2013.01)

(56) References Cited

U.S. PATENT DOCUMENTS

| | | | | |
|---|---|---|---|---|
| 2017/0200420 A1* | 7/2017 | No | .................. | G11C 19/287 |
| 2017/0287432 A1 | 10/2017 | Yoon et al. | | |
| 2017/0309242 A1* | 10/2017 | Kim | .................. | H01L 29/78675 |
| 2018/0130426 A1 | 5/2018 | Xing et al. | | |
| 2018/0315387 A1* | 11/2018 | Park | ..................... | G09G 3/3674 |
| 2019/0146260 A1 | 5/2019 | Kim | | |
| 2020/0081289 A1 | 3/2020 | Shin et al. | | |
| 2020/0327854 A1* | 10/2020 | Park | ..................... | G09G 3/3233 |
| 2021/0065642 A1* | 3/2021 | Shin | ..................... | G09G 3/3674 |
| 2021/0225316 A1* | 7/2021 | Huang | ................. | G09G 3/3677 |

FOREIGN PATENT DOCUMENTS

| | | |
|---|---|---|
| CN | 103745707 A | 4/2014 |
| CN | 104810002 A | 7/2015 |
| CN | 107978293 A | 5/2018 |
| CN | 108806573 A | 11/2018 |
| CN | 109119039 A | 1/2019 |
| CN | 109523963 A | 3/2019 |
| CN | 110888277 A | 3/2020 |
| WO | 03100511 A1 | 12/2003 |

* cited by examiner

DISPLAY PANEL HAVING OPENING IN FIRST ELECTRODE AND DISPLAY DEVICE THEREOF

FIELD OF DISCLOSURE

The present disclosure relates to a field of display panel technologies and in particular, to a display panel and a display device.

DESCRIPTION OF RELATED ART

In the field of display technology today, liquid crystal displays (LCD) and organic light-emitting diode (OLED) displays have been widely used in daily life, such as mobile phones or televisions. Taking the LCD display panel as an example, the LCD display panel is mainly composed of a thin film transistor (TFT) array substrate, a color filter (CF) substrate, and a liquid crystal layer disposed between the two substrates. As TFT has been improved in its performance, gate driver on array (GOA) technology in which a gate circuit is directly formed in the TFT array substrate has been widely used in display panels.

At present, LCD TV products use GOA technology to achieve narrow-bezel or bezel-less design, especially in ultra-high resolution (8K) TV products. With the improvement of image quality, a GOA circuit uses multiple TFT tubes. A channel length of each tube and a final completion ratio of the source/drain etching is critical to normal operations and stability of the entire circuit. However, a source signal of each level GOA comes from a bus-line area of the GOA. Please refer to FIG. 1. FIG. 1 illustrates a GOA signal input structure which includes: GOA units 61 to 64 provided on one side of the array substrate, clock signal lines 11 to 14 in a bus-line area, and connection lines 31 to 34 electrically connected to the clock signal lines 11 to 14 and arranged corresponding to the GOA units 61 to 64. A second electrode 82 is arranged on one side of a color filter substrate. The second electrode 82 is a conventional electrode, and the conventional electrode is a common electrode, and the conventional common electrode is distributed over an entire surface of the color filter substrate. The second electrode 82 covers the clock signal lines and the connection lines. Due to the fact that different lengths/areas of the clock signal lines 11 to 14 and the connection lines 31 to 34 are connected to the GOA units 61 to 64, capacitances of capacitors formed by the clock signal lines 11 to 14, the connection lines 31 to 34, and the second electrode 82 are different. The ultra-high resolution products are highly sensitive to resistance/capacitance. When in-plane signals are transmitted to the GOA units 61 to 64, there is a difference in a falling time (signal falling edge time, signal delay) of the in-plane signals, resulting in problems such as horizontal lines appearing in in-plane display images.

SUMMARY

The present application provides a display panel and a display device to solve a technical problem that horizontal lines appear in in-plane display images due to different capacitances formed by clock signal lines, connection lines, and a second electrode in a conventional display panel.

A display panel comprises:
a plurality of gate driver on array (GOA) units arranged along a first direction;
a plurality of clock signal lines arranged along a second direction, wherein the clock signal lines are disposed at one side of the GOA units and extended along the first direction, and the second direction is perpendicular to the first direction;
a plurality of connection lines, each of the connection lines extended along the second direction and connected between the corresponding clock signal line and the corresponding GOA units; and
a first electrode disposed at one side of the GOA units, the clock signal lines, and the connection lines, wherein the first electrode comprises an opening, and the opening is arranged corresponding to at least one of the clock signal lines and/or at least one of the connection lines.

A display panel comprises:
a first clock signal driving line and a second clock signal driving line;
a first gate driver on array (GOA) unit and a second GOA unit, wherein the first clock signal driving line is connected to the first GOA unit, and the second clock signal driving line is connected to the second GOA unit; and
a first electrode, wherein an opening is defined in the first electrode, and an area of the opening corresponding to the first clock signal driving line is greater than an area of the opening corresponding to the second clock signal driving line.

The present application further provides a display device comprising a display panel, wherein the display panel comprises:
a first clock signal driving line and a second clock signal driving line;
a first gate on array (GOA) unit and a second GOA unit, the first clock signal driving line is connected to the first GOA unit, and the second clock signal driving line is connected to the second GOA unit; and
a first electrode, wherein an opening is defined in the first electrode, and an area of a portion of the opening corresponding to the first clock signal driving line is greater than an area of a portion of the opening corresponding to the second clock signal driving line.

Advantages of the Present Application

By having an opening in the first electrode, a difference in capacitance of capacitors formed by the clock signal lines, the connection lines, and the first electrode is reduced, so as to improve problems such as horizontal lines appearing in in-plane display images.

BRIEF DESCRIPTION OF DRAWINGS

Technical solutions and other beneficial effects of the present application will be apparent through a detailed description provided below in conjunction with the accompanying drawings and specific embodiments.

DETAILED DESCRIPTION OF EMBODIMENTS

Figure 1:
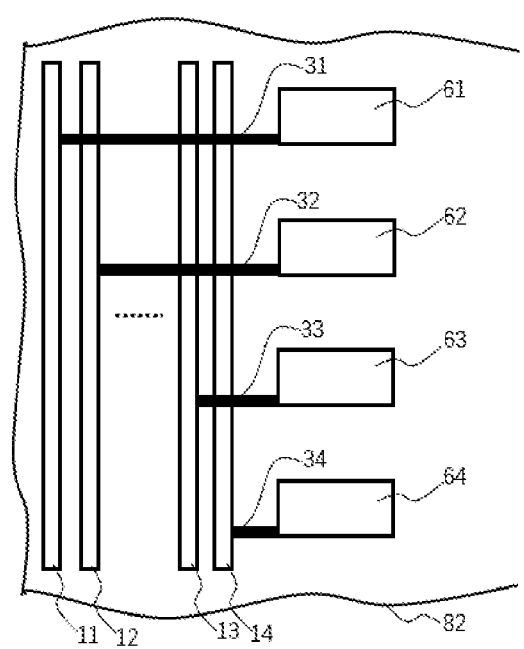
FIG. 1 is a schematic structural view illustrating a bezel region of a conventional display panel.

Technical solutions and embodiments of the present application will be described clearly and completely in conjunction with the accompanying drawings. Obviously, the described embodiments are only some of the embodiments of the present application, but not all the embodiments. Based on the embodiments in the present application, all other embodiments obtained by those skilled in the art without inventiveness fall within the protection scope of the present application.

In the description of the present application, it should be understood that the terms like "center", "longitudinal", "transverse", "length", "width", "thickness", "upper", "lower", "front", "rear", "left", "right", "vertical", "horizontal", "top", "bottom", "inner", "outer", "clockwise", and "counterclockwise" are illustrative for ease of description based on the drawings, rather than indicating or implying that the device or element referred to must have a specific orientation, or be constructed and operated in a specific orientation, Therefore, those terms cannot be understood as limitations to this application. In addition, the terms "first" and "second" are used for illustrative purposes only, and cannot be understood as indicating or implying relative importance or implicitly indicating the number of technical features indicated. Thus, features defined as "first" and "second" may explicitly or implicitly include one or more of the features. In the description of the present application, "multiple" means two or more, unless otherwise specified.

In the present application, it should be noted that, unless otherwise clearly specified, the terms "mounted", "connected", and "coupled" should be understood in a broad sense, for example, two elements can be fixed connected, or detachably connected, or integrally connected; they can be mechanically or electrically connected, or can communicate with each other; they can be directly connected, or indirectly connected through an intermediary, and they can internally communicate with each other or there can be interaction between the two elements. Those of ordinary skill in the art can understand the specific meanings of the above terms in the present application on a case-by-case basis.

In the present application, unless otherwise clearly specified and defined, the first element being "above" or "below" the second element can indicate that the first and second elements are in direct contact with each other, or the first and second elements do not directly contact each other but contact through another element between them. Moreover, the first element being "on", "above", or "over" the second element can indicate that the first element is right above and obliquely over the second element, or simply means that the first element is higher in level than the second element. The first element being "under", "below" and "beneath" the second element indicates that the first element is right under and obliquely below the second element, or simply means that the first element is lower in level than the second element.

The following disclosure describes many different embodiments or examples for implementing different structures of the present application. In order to simplify the description of the present application, specific examples are given below to describe components and configurations. Certainly, they are only examples, and are not intended to limit the present application. In addition, reference numerals and/or reference letters may be repeated in different examples of the present application. Such repetition is for the purpose of simplicity and clarity, and does not indicate the relationship between various embodiments and/or configurations discussed. In addition, the present application provides examples of specific processes and materials, but those of ordinary skill in the art can be aware of the use of other processes and/or the use of other materials.

The present application provides a display panel, comprising:

a plurality of gate driver on array (GOA) units arranged along a first direction;

a plurality of clock signal lines arranged along a second direction, the clock signal lines disposed at one side of the GOA units and extended along the first direction, wherein the second direction is perpendicular to the first direction;

a plurality of connection lines, each of the connection lines extended along the second direction and connected between the corresponding clock signal line and the corresponding GOA units; and a first electrode disposed at one side of the GOA units, the clock signal lines, and the connection lines, wherein the first electrode comprises an opening, and the opening is arranged corresponding to at least one of the clock signal lines and/or at least one of the connection lines.

In the present application, by defining an opening in the first electrode, a difference in capacitance value between the capacitors formed by the clock signal lines, the connection lines, and the first electrode is reduced, thus improving a technical problem such as horizontal lines appearing in in-plane display images.

The present application is further described below with reference to the accompanying drawings and embodiments.

First Embodiment

Figure 2:
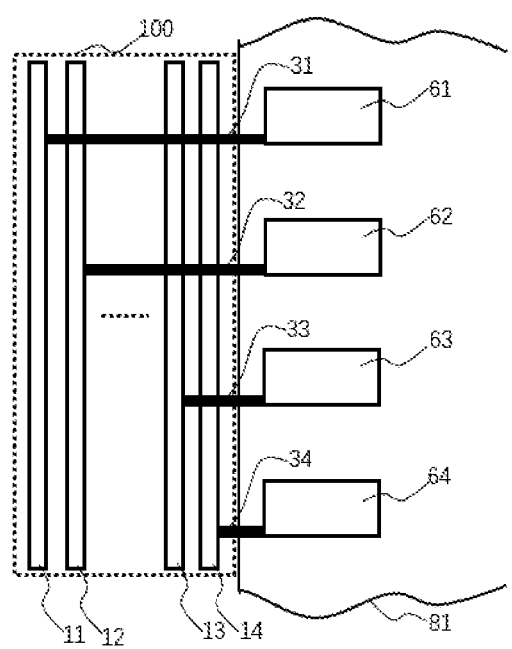
FIG. 2 is a first schematic structural view illustrating a bezel region of a display panel according to a first embodiment of the present application.
Figure 3:
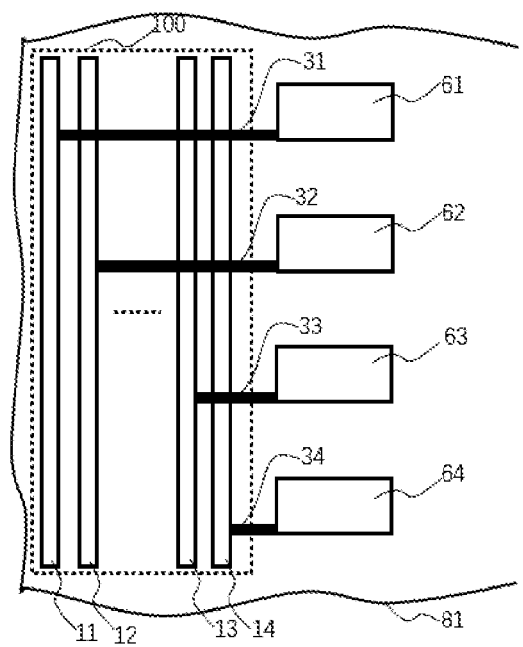
FIG. 3 is a second schematic structural view illustrating the bezel region of the display panel according to the first embodiment of the present application.

Please refer to FIG. 2 to FIG. 3. Types of display panels include, but are not limited to, liquid crystal display panels, organic light-emitting display panels, and quantum dot display panels. The present application provides a display panel, comprising:

a plurality of gate driver on array (GOA) units 61 to 64 arranged along a first direction;

a plurality of clock signal lines 11 to 14 arranged along a second direction, the clock signal lines 11 to 14 disposed at one side of the GOA units 61 to 64 and extended along the first direction, wherein the second direction is perpendicular to the first direction;

a plurality of connection lines 31 to 34, the connection lines 31 to 34 extended along the second direction and connected between the corresponding clock signal lines 11 to 14 and the corresponding GOA units 61 to 64; and a first electrode 81 disposed at one side of the GOA units 61 to 64, the clock signal lines 11 to 14, and the connection lines 31 to 34, wherein the first electrode 81 comprises an opening 100, and the opening 100 is arranged corresponding to at least one of the clock signal lines 11 to 14 and/or at least one of the connection lines 31 to 34, such configuration includes, but is not limited to, the opening 100 being arranged corresponding to the clock signal lines 11 to 14, and portions of the connection lines 31-34 between the clock signal lines 11 to 14. The opening 100 is arranged corresponding to at least one of the clock signal lines 11 to 14 and/or at least one of the connection lines 31 to 34. This means that the opening 100 is arranged corresponding to at least one of the clock signal lines 11 to 14, or the opening 100 is arranged corresponding to the connection lines 31 to 34, or the opening 100 is arranged corresponding to at least one of the clock signal lines 11 to 14 and at least one of the connection lines 31 to 34; however, the present application is not limited in this regard. Also, the opening 100 can include one opening, or two or more sub-openings; however, the present application is not limited in this regard. In the following description, an example is given in which the opening 100 is arranged corresponding to the clock signal lines 11 to 14 and portions of the connection lines 31 to 34 between the clock signal lines 11 to 14. It should be noted that, the first electrode 81 is located on one side of the GOA units 61 to 64, the clock signal lines 11 to 14, and the connection lines 31 to 34. "one side" here refers to the side that the first electrode 81 is arranged on a plane where the clock signal lines 11 to 14 (or a plane where the connection lines 31 to 34 are located, or a plane where the GOA units 61 to 64 are located); the configuration includes, but is not limited to, the first electrode 81 being located above or below the plane where the color signal lines 11 to 14 are located (or the plane where connection lines 31 to 34 are located, or the plane where the GOA units 61 to 64 are located).

In FIG. 2, the opening 100 is arranged corresponding to the clock signal lines 11 to 14, and the portions of the connection lines 31 to 34 between the clock signal lines 11 to 14. The first electrode 81 is not disposed at one side of the opening 100 away from in the GOA units 61 to 64 in the second direction. In FIG. 3, the opening 100 is arranged corresponding to the clock signal lines 11 to 14 and portions of the connection lines 31 to 34 between the clock signal lines 11 to 14, and the first electrode 81 is also arranged at one side of the opening 100 away from the GOA units 61 to 64 in the second direction.

A method for forming the opening 100 includes: first, manufacturing the first electrode 81 with a whole surface, and then forming the opening 100 through steps such as exposure and etching steps. Material of the first electrode 81 includes, but is not limited to, indium tin oxide (ITO). The connection lines 31 to 34 and the clock signal lines 11 to 14 are metal lines in different layers and are separated by an insulating layer. The connection lines 31 to 34 are electrically connected to the corresponding clock signal lines 11 to 14 via through holes in the insulating layer. In some embodiments, the clock signal lines 11-14 are made of a first metal layer, and the connection lines 31 to 34 are made of a second metal layer. The first metal layer and the second metal layer are separated by the insulating layer. The connection lines 31 to 34 of the second metal layer are electrically connected to the corresponding clock signal lines 11-14 of the first metal layer via the through holes in the insulating layer. In some embodiments, the first metal layer and the second metal layer can be formed and etched in a same manufacturing step as an in-plane metal layer of the display panel. For example, the first metal layer can be in a same layer as scan lines, the second metal layer can be in a same layer as data lines, or the first metal layer can be in a same layer as the scan lines or the data lines, and the second metal layer can be in a same layer as a common electrode or a pixel electrode, but the present application is not limited to these examples.

In the present embodiment, by having the opening arranged corresponding to at least one clock signal line and/or at least one connection line, a difference in capacitance between the clock signal lines, the connection lines, and the first electrode is reduced, thereby reducing a difference in a falling time (signal falling time, signal delay) when in-plane signals are transmitted to the GOA units, thus improving a problem that horizontal lines appear in in-plane display images.

Second Embodiment

Figure 4:
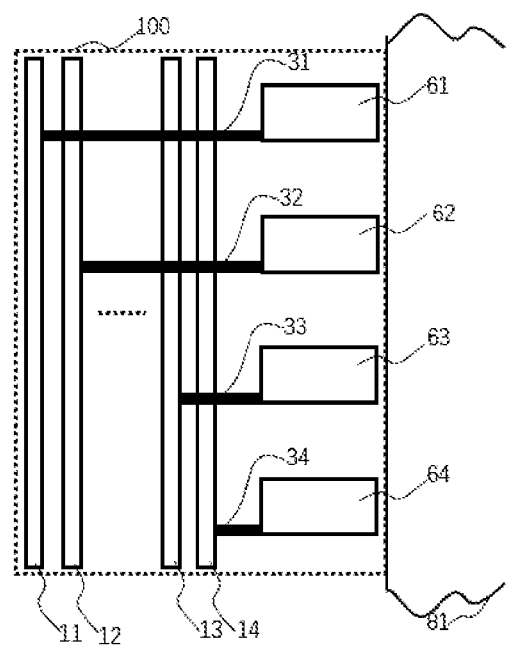
FIG. 4 is a first schematic structural view illustrating the bezel region of the display panel according to a second embodiment of the present application.
Figure 5:
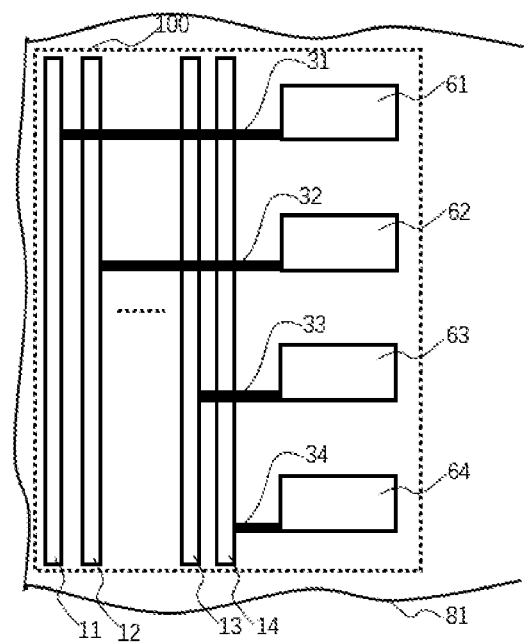
FIG. 5 is a second schematic structural view illustrating the bezel region of the display panel according to the second embodiment of the present application.

The present embodiment is the same as or similar to the first embodiment, except for the following:

Please refer to FIGS. 4 and 5, the display panel has the first electrode 81, the first electrode 81 is disposed on one side of the GOA units 61 to 64, the clock signal lines 11 to 14, and the connection lines 31 to 34. The first electrode 81 has the opening 100 arranged corresponding to the clock signal lines 11 to 14, the connection lines 31 to 34, and the GOA units 61 to 64.

In the present embodiment, by having the opening arranged corresponding to multiple clock signal lines, multiple connection lines, and multiple GOA units, a difference in capacitance between the clock signal lines, the connection lines, and the first electrode is reduced, thereby reducing a difference in a falling time (signal falling time, signal delay) when in-plane signals are transmitted to the GOA units, thus improving a problem that horizontal lines appear in in-plane display images.

Third Embodiment

Figure 6:
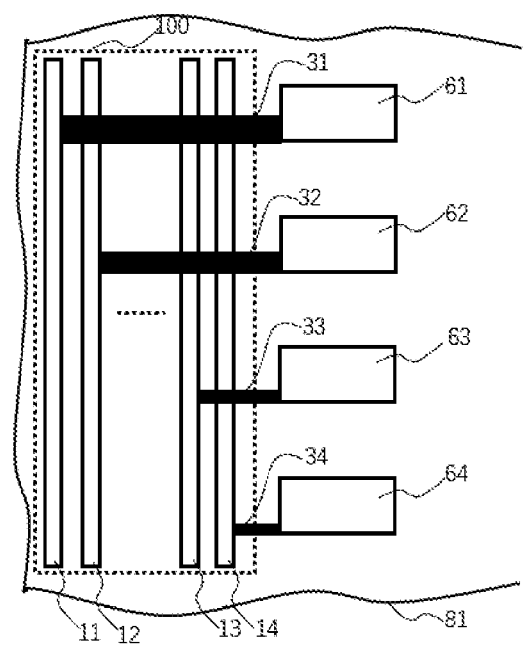
FIG. 6 is a first schematic structural view illustrating the bezel region of the display panel according to a third embodiment of the present application.
Figure 7:
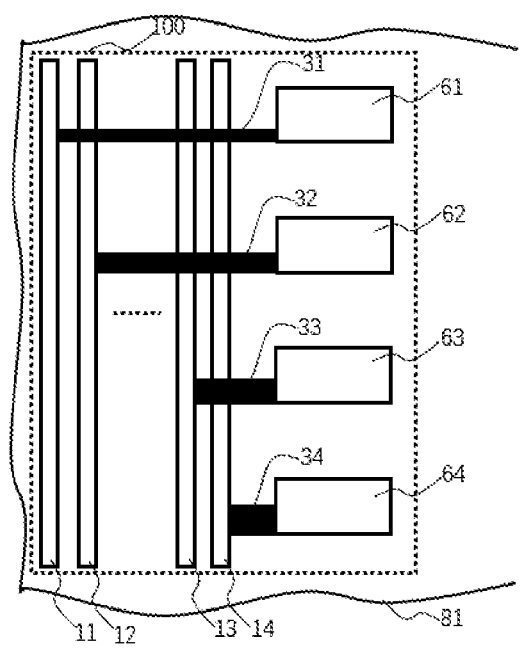
FIG. 7 is a second schematic structural view illustrating the bezel region of the display panel according to the third embodiment of the present application.

The present embodiment is the same as or similar to the first embodiment and the second embodiment, except for the following:

Please refer to FIG. 6 and FIG. 7. In FIG. 6, among the connection lines 31 to 34, at least two connection lines have a gradually decreasing width to reduce a difference in resistance between the connection lines 31 to 34. In FIG. 7, among the connection lines 31 to 34, at least two connection lines have a gradually increasing width to reduce a difference in capacitance between the connection line 31 to 34 and the first electrode 81.

Furthermore, the present embodiment can have the opening 100 in both the first embodiment and the second embodiment at the same time.

The present embodiment have two settings—the opening 100 and the gradual change in the width of the connection lines—to reduce a difference in capacitance between the clock signal lines, the connection lines, and the first electrode, and at the same time reduce a difference in resistance between the connection lines, thereby reducing a difference in the falling time when in-plane signals are transmitted to the GOA units and improving problems that horizontal lines appear in in-plane display images.

Fourth Embodiment

Figure 8:
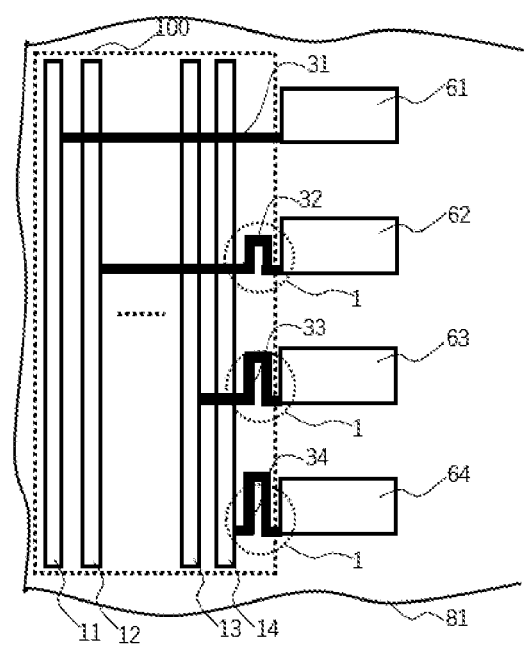
FIG. 8 is a first schematic structural view illustrating the bezel region of the display panel according to a fourth embodiment of the present application.

The present embodiment is the same as or similar to the first to the third embodiments, except for the following:

Please refer to FIG. 8. Furthermore, in order to compensate for a difference in resistance caused by different lengths of the clock signal lines and the connection lines. The connection lines are designed with a winding compensation portion. In FIG. 8, the GOA units 61 to 64 are arranged along the first direction, and the clock signal lines 11 to 14 are arranged along the second direction. The clock signal lines 11 to 14 are located on one side of the GOA units 61 to 64 and extended along the first direction, and the second direction is perpendicular to the first direction. The connection lines 31 to 34 are extended along the second direction and are connected between the corresponding clock signal lines 11 to 14 and the corresponding GOA units 61 to 64. The clock signal lines 11, 12, 13, and 14 are located on one side of the GOA units 61 to 64 and are sequentially close to the GOA units 61 to 64. The connection line 31 is electrically connected to the clock signal line 11 and the GOA unit 61, and the connection line 32 is electrically connected to the clock signal line 12 and the GOA unit 62, the connection line 33 is electrically connected to the clock signal line 13 and the GOA unit 63, and the connection line 34 is electrically connected to the clock signal line 14 and the GOA unit 64. The connection lines 31, 32, 33, and 34 have a gradually decreasing length, and the connection lines 31, 32, 33, and 34 are each provided with a compensation portion 1 with a gradually increasing winding compensation length, which can reduce the difference in resistance between the connection lines 31, 32, 33, and 34.

Furthermore, the connection lines 31, 32, 33, and 34 are provided with gradually decreasing winding compensation lengths, which can reduce a difference in capacitance of the capacitors between the first electrode 81 and the clock signal line 11 and the connection line 31, the clock signal line 12 and the connection line 32, the clock signal line 13 and the connection line 33, the clock signal line 14 and the connection line 34. In the present embodiment, the number of winding compensation portions is defined as follows. Areas of the winding compensation portions of at least two connection lines gradually increase or gradually decrease in the first direction.

FIG. 8 illustrates that the opening 100 in the preferable embodiment is arranged corresponding to the winding compensation portions 1 of the connection lines 31 to 34 at the same time. In some embodiments, the opening 100 may be arranged not corresponding to the winding compensation portions 1 of the connection lines 31 to 34. For example, the opening 100 is provided at one side of the winding compensation portions 1 of the connection lines 31 to 34 away from the GOA units 61 to 64.

The present embodiment has two settings at the same time, i.e. the opening and the winding compensation portions of the connection lines. This reduces the difference in capacitance of capacitors formed between the clock signal lines, the connection lines, and the first electrode, and the difference in the resistance between the connection lines, thereby reducing the difference in the falling time of the in-plane signal transmitted to the GOA units, and thus improving the problem that horizontal lines appear in in-plane display images.

In the first to fourth embodiments, types of the display panels can include, but are not limited to, liquid crystal display panels, organic light-emitting display panels, and quantum dot display panels. The display panel comprises, but is not limited to: an array substrate, wherein the clock signal lines 11 to 14, the GOA units 61 to 64, and the connection lines 31 to 34 are arranged on one side of the array substrate; and a color filter substrate, wherein the first electrode 81 is arranged on one side of the color filter substrate, and the first electrode 81 is a common electrode.

In the first to fourth embodiments, when the display panel is a liquid crystal display panel, a vertical alignment (VA) liquid crystal display panel is taken as an example for description, and the display panel can comprise: an array substrate; the clock signal lines 11 to 14, wherein the GOA units 61 to 64, and connection lines 31 to 34 are disposed on one side of the array substrate; and a color filter substrate, wherein the first electrode 81 and a color resist layer (not illustrated) are arranged on one side of the color filter substrate, the first electrode 81 is a common electrode, and the color resist layer includes a red color resist, a green color resist, and a blue color resist.

In the first to fourth embodiments, when the display panel is a liquid crystal display panel, a vertical alignment (VA) liquid crystal display panel is taken as an example for description. At this time, the liquid crystal display panel may be a CF on array (COA) display panel. The display panel can include: an array substrate, wherein the clock signal lines 11 to 14, the GOA units 61 to 64, the connection lines 31 to 34, and a color resist layer (not illustrated) are disposed on one side of the array substrate, and the color resist layer includes a red color resist, a green color resist, and a blue color resist; and color filter substrate, wherein the first electrode 81 is disposed on one side of the color filter substrate, and the first electrode 81 is a common electrode.

Fifth Embodiment

Figure 9:
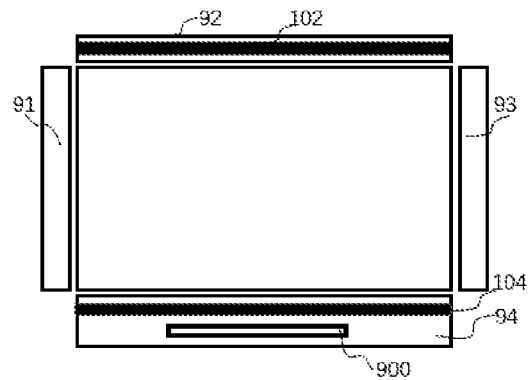
FIG. 9 is a first schematic top view illustrating the display panel according to a fifth/tenth embodiment of the present application.
Figure 10:
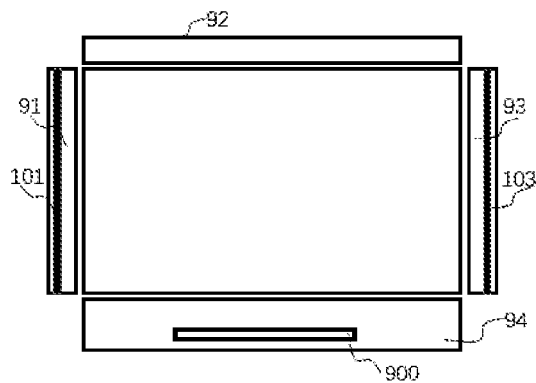
FIG. 10 is a second schematic top view illustrating the display panel according to the fifth/tenth embodiment of the present application.
Figure 11:
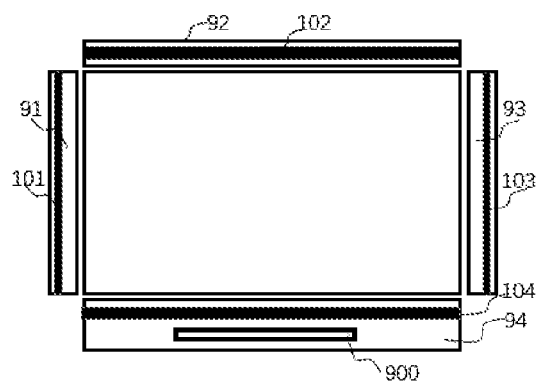
FIG. 11 is a third schematic top view illustrating the display panel according to the fifth/tenth embodiment of the present application.

Please refer to FIGS. 9 to 11. Based on the first to fourth embodiments, the display panel of the present embodiment takes a vertical alignment (VA) liquid crystal display panel as an example for description.

In the present embodiment, the liquid crystal display panel comprises: an array substrate, wherein the clock signal lines 11 to 14, the GOA units 61 to 64, and connection lines 31 to 34 are disposed on one side of the array substrate; and a color filter substrate, wherein the first electrode 81 is disposed on one side of the color filter substrate, and the first electrode 81 is a common electrode. The display panel comprises a display area and a non-display area surrounding the display area. The non-display area comprises a first border region 91 and a third border region 93 disposed opposite to each other, and a second border region 92 and a fourth border region 94 disposed opposite to each other. The second border region 92 is connected between the first border region 91 and the third border region 93, and the fourth border region 94 is connected between the first border region 91 and the third border region 93.

In FIG. 9, the display panel includes two sets of the GOA units 61 to 64, two sets of the clock signal lines 11 to 14 and two sets of the connection lines 31 to 34, and two sets of the GOA units 61 to 64. The two sets of the clock signal lines 11 to 14 and the two sets of the connection lines 31 to 34 are respectively disposed on two sides of the array substrate, and respectively disposed in the first border region 91 and the third border region 93. The first electrode 81 includes two openings 100, and the first electrode 81 is a common electrode. The display panel includes common electrode conductive units 102, 104. The array substrate is disposed opposite to the color filter substrate, the array substrate includes a common trace, and the common electrode conductive unit 102 is located between the array substrate and the color filter substrate and in the second border region 92. The common electrode conductive unit 104 is located between the array substrate and the color filter substrate and in the fourth border region 94. The common electrode conductive units 102, 104 are electrically connected to the common electrode and the common trace, so that common signals on the array substrate are connected to the common electrode through the common trace and the common electrode conductive unit. Configuration of the common electrode conductive unit includes but is not limited to: being electrically connected through a gold ball (Au ball) in a seal.

In FIG. 10, a common electrode conductive unit 101 can be disposed between the array substrate and the color filter substrate and located in the first border region 91. A common electrode conductive unit 103 can be arranged between the array substrate and the color filter substrate and located in the third border region 93. The common electrode conductive units 101 and 103 are electrically connected to the common electrode and the common trace, so that the common signal on the array substrate is connected to the common electrode through the common trace and the common electrode conductive unit. Configuration of the common electrode conductive unit includes but is not limited to: being electrically connected through a gold ball (Au ball) in a seal.

In FIG. 11, the common electrode conductive unit 101 is arranged between the array substrate and the color filter substrate and located in the first border region 91. The common electrode conductive unit 102 is arranged between the array substrate and the color filter substrate and located in the second border region 92. The common electrode conductive unit 103 is arranged between the array substrate and the color filter substrate and located in the third border region 93. The common electrode conductive unit 104 is arranged between the array substrate and the color filter substrate and in the fourth border region 94. The common electrode conductive units 101, 102, 103, 104 are electrically connected to the common electrode and the common trace, so that the common signal on the array substrate is connected to the common electrode through the common trace and the common electrode conductive unit. Configuration of the common electrode conductive unit includes but is not limited to: being electrically connected through a gold ball (Au ball) in a seal.

Two sets of the GOA units 61 to 64, two sets of the clock signal lines 11 to 14, and two sets of the connection lines 31 to 34 are disposed on the array substrate, and respectively disposed in the first border region 91 and the third border region 93. Furthermore, the common electrode conductive unit 101 is arranged between the array substrate and the color filter substrate and located in the first border region 91, and a common electrode conductive unit 103 is arranged between the array substrate and the color filter substrate and located in the third border region 93. Preferably, each of the common electrode conductive units 101 and 103 is correspondingly disposed at one side of the opening 100 away from the GOA units 61 to 64 in the second direction. The common electrode conductive units 101 and 103 electrically connect the common electrode and the common trace on the array substrate at one side of the opening 100 away from the GOA units 61 to 64 in the second direction. However, configuration is not limited to the above. Alternatively, each of the common electrode conductive units 101 and 103 is correspondingly disposed on one side of the opening 100 close to the GOA units 61 to 64 in the second direction. The common electrode conductive units 101 and 103 electrically connect the common electrode and the common trace on the array substrate at one side of the opening 100 close to the GOA units 61 to 64 in the second direction; or, the common electrode conductive units 101 and 103 are arranged at two sides of the opening 100, and the common electrode conductive units 101 and 103 electrically connect the common electrodes at two sides of the opening 100 close to and away from the GOA units 61 to 64 in the second direction.

In the present embodiment, the opening 100 is provided to reduce the difference in capacitance of the capacitor formed by the clock signal lines, the connection lines, and the first electrode, thereby reducing the difference in the falling time of the in-plane signal transmitted to the GOA units, thus improving a problem that horizontal lines appear in in-plane display images. At the same time, when the display panel is a liquid crystal display panel, especially a vertical alignment (VA) liquid crystal display panel, a common electrode signal is transmitted through the common electrode conductive unit between the array substrate and the color filter substrate.

The present application also provides a display panel which comprises: a first clock signal driving line and a second clock signal driving line, wherein when a second electrode covers the first clock signal driving line and the second clock signal driving line, a capacitance of a capacitor formed by the second electrode and the first clock signal driving line is greater than a capacitance of a capacitor formed by the second electrode and the second clock signal driving line;

a first gate driver on array (GOA) unit and a second GOA unit, wherein the first clock signal driving line is connected to the first GOA unit, and the second clock signal driving line is connected to the second GOA unit; and a first electrode, wherein an opening is defined in the first electrode, and an area of the opening corresponding to the first clock signal driving line is greater than an area of the opening corresponding to the second clock signal driving line.

The present application reduces the difference in capacitance of capacitors formed by the clock signal lines, the connection lines, and the first electrode by having an opening in the first electrode, thus improving problems such as horizontal lines appearing in the plane.

Sixth Embodiment

Figure 12:
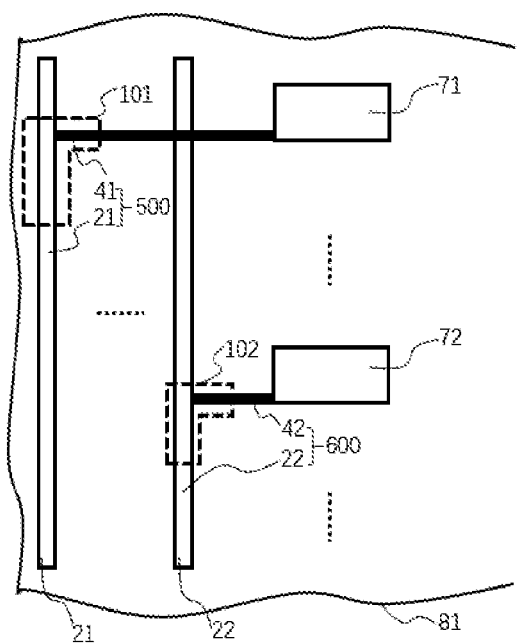
FIG. 12 is a first schematic structural view illustrating the bezel region of the display panel according to a sixth/seventh embodiment of the present application.
Figure 13:
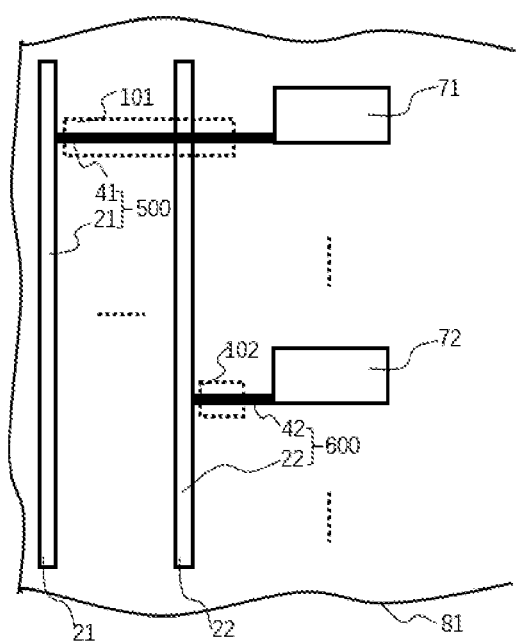
FIG. 13 is a second schematic structural view illustrating the bezel region of the display panel according to the sixth/seventh embodiment of the present application.
Figure 14:
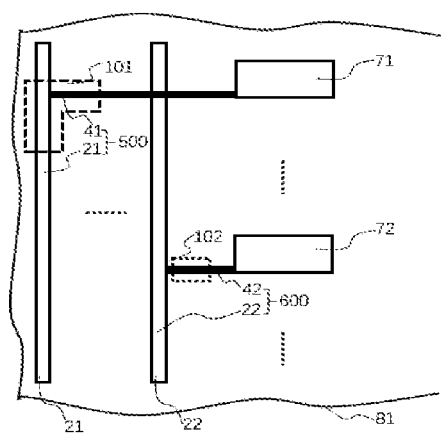
FIG. 14 is a third schematic structural view illustrating the bezel region of the display panel according to the sixth/seventh embodiment of the present application.

Please refer to FIGS. 12 to 14. Types of the display panels include, but are not limited to, liquid crystal display panels, organic light-emitting display panels, and quantum dot display panels. In FIGS. 12, 13, and 14, the display panel includes: a first clock signal driving line 500, wherein the first clock signal driving line 500 includes a first clock signal line 21 and a first connection line 41; a second clock signal driving line 600, wherein the second clock signal driving line 600 includes a second clock signal line 22 and a second connection line 42; a first GOA unit 71 and a second GOA unit 72, wherein the first connection line 41 is electrically connected to the first clock signal line 21 and the first GOA unit 71, and the second connection line 42 is electrically connected between the second clock signal line 22 and the second GOA unit 72; and the first electrode 81, wherein an opening 100 is defined in the first electrode 81, and the opening 100 includes sub-openings 101 and 102. It should be noted that terms "first" and "second" here are only used to describe technical features of the display panel, and they do not mean that the display panel only has the first and second clock signal driving lines and the first and second GOA units. The display panel can include a certain number of the clock signal driving lines and a certain number of the GOA units, and other structures; and the present application is not limited in this regard.

Continuing to illustrate with reference to FIG. 1, when a second electrode 82 (the second electrode 82 is a conventional electrode, and the conventional electrode is provided on an entire surface) covers the first clock signal driving line 500 and the second clock signal driving line 600, a capacitance of a capacitor formed by the second electrode 82 and the first clock signal driving line 500 is greater than a capacitance of a capacitor formed by the second electrode 82 and the second clock signal driving line 600.

In the present embodiment, the opening 100 is defined in the first electrode 81, and the opening 100 includes sub-openings 101 and 102. An area of the sub-opening 101 corresponding to the first clock signal driving line 500 is greater than an area of the sub-opening 102 corresponding to the second clock signal driving line 600.

In FIGS. 12, 13, and 14, in some embodiments, the sub-opening 101 of the first electrode 81 is arranged corresponding to the first clock signal driving line 500, and the sub-opening 102 of the first electrode 81 is arranged corresponding to the second clock signal driving line 600. In some embodiments, the sub-opening 101 of the first electrode 81 can be disposed corresponding to the first clock signal line 21 or/and the first connection line 41, and the sub-opening 102 of the first electrode 81 can be disposed corresponding to the second clock signal line 22 or/and the second connection line 42. Some embodiments can include the sub-opening 101 only, and the area of the sub-opening 102 is zero. Configuration of the sub-openings 101 and 102 is not limited herein, as long as the area of the sub-opening 101 corresponding to the first clock signal driving line 500 is greater than the area of the sub-opening 102 corresponding to the second clock signal driving line 600.

A method of forming the sub-openings 101 and 102 includes: first, forming the first electrode 81 distributed over an entire surface, and then forming the sub-openings 101 and 102 through manufacturing steps such as exposure and etching. Material of the first electrode 81 includes, but is not limited to, indium tin oxide (ITO). The first and second connection lines and the first and second clock signal lines are metal lines in different layers and are separated by an insulating layer. The first and second connection lines are electrically connected to the corresponding first and second clock signal lines via through holes in the insulating layer. In some embodiments, the first metal layer and the second metal layer can be formed and etched in a manufacturing step the same as a step of forming an in-plane metal layer of the display panel. For example, the first metal layer can be in a same layer as scan lines, the second metal layer can be in a same layer as data lines, or the first metal layer can be in a same layer as the scan lines or the data lines, and the second metal layer can be in a same layer as a common electrode or a pixel electrode, but the present application is not limited to these examples.

In the present embodiment, a capacitance of a capacitor formed by the second electrode and the first clock signal driving line is greater than a capacitance of a capacitor formed by the second electrode and the second clock signal driving line. The sub-openings are arranged corresponding to the first clock signal driving line of the first electrode and the second clock signal driving line of the first electrode. The area of the sub-opening corresponding to the first clock signal driving line is greater than the area of the sub-opening corresponding to the second clock signal driving line, thus reducing the difference in the capacitance of the capacitors formed by the first clock signal driving line, the second clock signal driving line, and the first electrode, thereby reducing a difference in a falling time (signal falling time, signal delay) of an in-plane signal transmitted to the GOA units and improving a problem such as horizontal lines appearing in in-plane display images.

Seventh Embodiment

The present embodiment is the same as or similar to the sixth embodiment, except for the following:

Referring to FIGS. 12 to 14, the first GOA unit 71 and the second GOA unit 72 are arranged along the first direction, the first clock signal line 21 and the second clock signal line 22 are arranged along the second direction, and the first clock signal line 21 is located at one side of the second clock signal line 22 away from the first GOA unit 71 and the second GOA unit 72. The first connection line 41 and the second connection line 42 extend along the second direction, and the second direction is perpendicular to the first direction. The first connection line 41 is electrically connected to the first clock signal line 21 and the first GOA unit 71, and the second connection line 42 is electrically connected to the second clock signal line 22 and the second GOA unit 72. Since the first clock signal line 21 is located at one side of the second clock signal line 22 away from the first GOA unit 71 and the second GOA unit 72, a length of the first connection line 41 is greater than a length of the second connection line 42.

In the present embodiment, the area of the first clock signal driving line 500 is greater than the area of the second clock signal driving line 600. The first clock signal line 21 or/and the first connection line 41 of the first clock signal driving line 500 have greater widths or/and lengths than the second clock signal line 22 or/and the second connection line 42 of the second clock signal driving line 600, so that the area of the first clock signal driving line 500 is greater than the area of the second clock signal driving line 600. Continuing to illustrate with reference to FIG. 1, when the second electrode 82 covers the first clock signal driving line 500 and the second clock signal driving line 600, the area of the first clock signal driving line 500 is greater than the area of the second clock signal driving line 600, so the a capacitance of a capacitor formed by the second electrode 82 and the first clock signal driving line 500 is greater than a capacitance of a capacitor formed by the second electrode 82 and the second clock signal driving line 600.

In the present embodiment, an opening 100 is defined in the first electrode 81, the opening 100 includes sub-openings 101 and 102. The sub-opening 101 is arranged corresponding to the first clock signal driving line 500, and the sub-opening 102 is arranged corresponding to the second clock signal driving line 600. An area of the sub-opening 101 is greater than an area of the sub-opening 102.

In the present embodiment, the area of the first clock signal driving line is greater than the area of the second clock signal driving line, so that the capacitance of the capacitor formed by the second electrode and the first clock signal driving line is greater than the capacitance of the capacitor formed by the second electrode and the second clock signal driving line. The sub-openings are respectively arranged corresponding to the first clock signal driving line and the second clock signal driving line in the first electrode, and the area of the sub-opening corresponding to the first clock signal driving line is greater than the area of the sub-opening corresponding to the second clock signal driving line, thereby reducing the difference in capacitance of the capacitors formed between the first clock signal driving line, the second clock signal driving line, and the first electrode, thus reducing a difference in a falling time of an in-plane signal transmitted to the GOA unit and improving problems such as horizontal lines appearing in in-plane display images.

Eighth Embodiment

Figure 15:
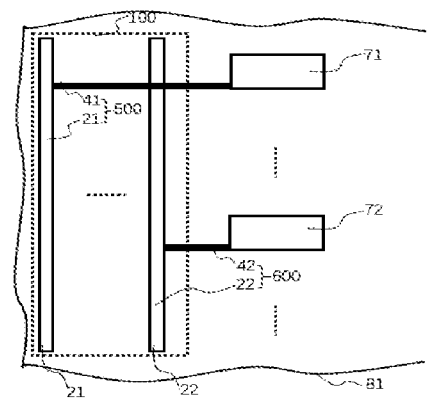
FIG. 15 is a first schematic structural view illustrating the bezel region of the display panel according to an eighth embodiment of the present application.

The present embodiment is the same as or similar to the sixth and seventh embodiments, except for the following:

Referring to FIG. 15, the opening 100 is arranged corresponding to the first clock signal line 21 and the second clock signal line 22, and corresponding to portions of the first connection line 41 and the second connection line 42 located between the first clock signal line 21 and the second clock signal line 22. In FIG. 15, a first electrode 81 is disposed at one side of the opening 100 away from the first GOA unit 71 and the second GOA unit 72 in the second direction; however, the first electrode 81 can be not disposed at one side of the opening 100 away from the first GOA unit 71 and the second GOA unit 72 in the second direction, and the present application is not limited in this regard.

In the present embodiment, the opening is arranged corresponding to the first clock signal line and the second clock signal line and corresponding to portions of the first connection line and the second connection line between the first clock signal line and the second clock signal line, thereby reducing the difference in capacitance of the capacitors formed by the clock signal lines, the connection lines, and the first electrode, thus reducing the difference in the falling time of the in-plane signal transmitted to the GOA unit and improving problems such as horizontal lines appearing in in-plane display images.

Ninth Embodiment

Figure 16:
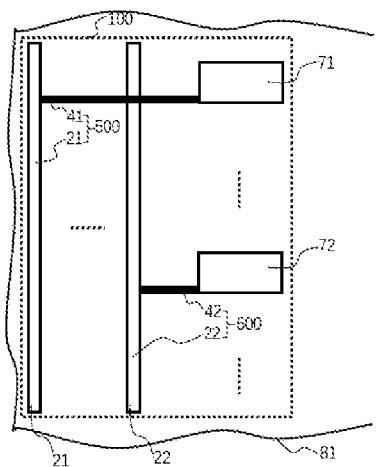
FIG. 16 is a schematic structural view illustrating the bezel region of the display panel according to a ninth embodiment of the present application.

The present embodiment is the same as or similar to the sixth to eighth embodiments, except for the following:

Referring to FIG. 16, the opening 100 is arranged corresponding to the first clock signal line 21, the second clock signal line 22, the first connection line 41, the second connection line 42, the first GOA unit 71, and the second GOA unit 72.

In the present embodiment, the opening is arranged corresponding to the first clock signal line, the second clock signal line, the first connection line, the second connection line, the first GOA unit, and the second GOA unit, thus reducing a difference in capacitance of capacitors formed by the clock signal lines, the connection lines, and the first electrode, thereby reducing a difference in a falling time of an in-plane signal transmitted to the GOA unit and accordingly improving problems such as horizontal lines appearing in in-plane display images.

In the sixth to ninth embodiments, types of the display panel can include, but are not limited to, liquid crystal display panels, organic light-emitting display panels, and quantum dot display panels. The display panel comprises but is not limited to: an array substrate, wherein the first clock signal line 21 and the second clock signal line 22, the first connection line 41 and the second connection line 42, and the first GOA unit 71 and the second GOA unit 72 are disposed on one side of the array substrate; the color filter substrate, wherein the first electrode 81 is disposed on one side of the color filter substrate, and the first electrode 81 is a common electrode.

In the sixth to ninth embodiments, when the display panel is a liquid crystal display panel, a vertical alignment (VA) liquid crystal display panel is taken as an example for description. The display panel can include an array substrate, wherein the first clock signal line 21 and the second clock signal line 22, the first connection line 41 and the second connection line 42, and the first GOA unit 71 and the second GOA unit 72 are disposed on one side of the array substrate; and a color filter substrate, wherein the first electrode 81 and a color resist layer (not illustrated) are arranged on one side of the color filter substrate. The first electrode 81 is a common electrode, and the color resist layer includes a red color resist, a green color resist, and a blue color resist.

In the sixth to ninth embodiments, when the display panel is a liquid crystal display panel, a vertical alignment (VA) liquid crystal display panel is taken as an example for description. At this time, the liquid crystal display panel can be a CF on array (COA) display panel, and the display panel can comprise: an array substrate, wherein the first clock signal line 21 and the second clock signal line 22, the first connection line 41 and the second connection line 42, the first GOA unit 71 and the second GOA unit 72, and a color resist layer (not illustrated) are disposed on one side of the array substrate, wherein the color resist layer comprises a red color resist, a green color resist, and a blue color resist; and a color filter substrate, wherein the first electrode 81 is arranged on one side of the color filter substrate, and the first electrode 81 is a common electrode.

Tenth Embodiment

Please refer to FIGS. 9 to 11. Based on the sixth to ninth embodiments, the display panel of the present embodiment is described by taking a vertical alignment (VA) liquid crystal display panel as an example.

In the present embodiment, the liquid crystal display panel comprises: an array substrate, wherein a first clock signal driving line 500, a second clock signal driving line 600, a first GOA unit 71, and a second GOA unit 72 are disposed on one side of the array substrate; a color filter substrate, wherein the first electrode 81 is disposed on one side of the color filter substrate, and the first electrode 81 is a common electrode. The display panel includes a display area and a non-display area surrounding the display area. The non-display area includes a first border region 91 and a third border region 93 disposed opposite to each other, and a second border region 92 and a fourth border region 94 disposed opposite to each other. The second border region 92 is connected between the first border region 91 and the third border region 93, and the fourth border region 94 is connected between the first border region 91 and the third border region 93.

In FIG. 9, the display panel comprises two sets of the GOA units 71 and 72 and two sets of the clock signal driving lines 500 and 600. The two sets of the GOA units 71 and 72 and the two sets of the clock signal driving lines 500 and 600 are disposed on the array substrate, wherein each two sets are disposed in the first border region 91 and the third border region 93, respectively. The first electrode 81 includes two openings 100, and the first electrode 81 is a common electrode. The display panel includes common electrode conductive units 102, 104. The array substrate is disposed opposite to the color filter substrate, the array substrate includes a common trace, and the common electrode conductive unit 102 is located between the array substrate and the color filter substrate and in the second border region 92. The common electrode conductive unit 104 is located between the array substrate and the color filter substrate and in the fourth border region 94. The common electrode conductive units 102 and 104 are electrically connected to the common electrode and the common trace, so that common signals on the array substrate are connected to the common electrode through the common trace and the common electrode conductive unit. Configuration of the common electrode conductive unit includes but is not limited to: being electrically connected through a gold ball (Au ball) in a seal.

In FIG. 10, a common electrode conductive unit 101 can be disposed between the array substrate and the color filter substrate and located in the first border region 91. A common electrode conductive unit 103 can be arranged between the array substrate and the color filter substrate and located in the third border region 93. The common electrode conductive units 101 and 103 are electrically connected to the common electrode and the common trace, so that a common signal on the array substrate is connected to the common electrode through the common trace and the common electrode conductive unit. Configuration of the common electrode conductive unit includes but is not limited to: being electrically connected through a gold ball (Au ball) in a seal.

In FIG. 11, the common electrode conductive unit 101 is arranged between the array substrate and the color filter substrate and located in the first border region 91. The common electrode conductive unit 102 is arranged between the array substrate and the color filter substrate and located in the second border region 92. The common electrode conductive unit 103 is arranged between the array substrate and the color filter substrate and located in the third border region 93. The common electrode conductive unit 104 is arranged between the array substrate and the color filter substrate and in the fourth border region 94. The common electrode conductive units 101, 102, 103, 104 are electrically connected to the common electrode and the common trace, so that the common signal on the array substrate is connected to the common electrode through the common trace and the common electrode conductive unit. Configuration of the common electrode conductive unit includes but is not limited to: being electrically connected through a gold ball (Au ball) in a seal.

In some embodiments, the two sets of the GOA units 71 and 72 and the two sets of the connection lines 500 and 600 are disposed on the array substrate, wherein each two sets are disposed in the first border region 91 and the third border region 93, respectively. Furthermore, the common electrode conductive unit 101 is arranged between the array substrate and the color filter substrate and located in the first border region 91, and a common electrode conductive unit 103 is arranged between the array substrate and the color filter substrate and located in the third border region 93. Preferably, each of the common electrode conductive units 101 and 103 is correspondingly disposed at one side of the opening 100 away from the GOA units 71 and 72 in the second direction. The common electrode conductive units 101 and 103 electrically connect the common electrode and the common trace at one side of the opening 100 away from the GOA units 71 and 72 in the second direction. However, configuration is not limited to the above. Alternatively, each of the common electrode conductive units 101 and 103 is correspondingly disposed on one side of the opening 100 close to the GOA units 71 and 72 in the second direction. The common electrode conductive units 101 and 103 electrically connect the common electrode and the common trace at one side of the opening 100 close to the GOA units 71 and 72 in the second direction; or, the common electrode conductive units 101 and 103 are arranged at two sides of the opening 100, and the common electrode conductive units 101 and 103 electrically connect the common electrodes at two sides of the opening 100 close to and away from the GOA units 71 and 72 in the second direction and the common trace on the array substrate.

In some embodiments, the two sets of the GOA units 71 and 72 and the two sets of the clock signal driving lines 500 and 600 are disposed on the array substrate, wherein each two sets are disposed in the first border region 91 and the third border region 93, respectively. The opening 100 includes the sub-opening 101 and the sub-opening 102. When the common electrode conductive unit 101 is disposed between the array substrate and the color filter substrate and located in the first border region 91, and the common electrode conductive unit 103 is disposed between the array substrate and the color filter substrate and located in the third border region 93, then the common electrode conductive units 101 and 103 can also be arranged in a non-opening area of the first electrode corresponding to the first clock signal driving line 500 and the second clock signal driving line 600.

In the present embodiment, the opening is provided to reduce the difference in capacitance of the capacitor formed by the clock signal lines, the connection lines, and the first electrode, thereby reducing the difference in the falling time of the in-plane signal transmitted to the GOA units, thus improving a problem that horizontal lines appear in in-plane display images. At the same time, when the display panel is a liquid crystal display panel, especially a vertical alignment (VA) liquid crystal display panel, a common electrode signal is transmitted through the common electrode conductive unit between the array substrate and the color filter substrate.

Based on the above embodiment, the present application further provides a display device, the display device comprises the above display panel. The display device includes, but is not limited to, a mobile phone, a notebook computer, and a television.

The present application is described in detail above. Specific examples are used to explain the working principles and embodiments of the present application. The descriptions of the above embodiments are only provided for ease of understanding the technical solutions and main ideas of the present application. Those of ordinary skill in the art can modify the technical solutions described in the foregoing embodiments, or equivalently replace some of the technical features. Such modification or replacement is deemed to be within the protection scope of the present application.

What is claimed is:

1. A display panel, comprising:
   a plurality of gate driver on array (GOA) units arranged along a first direction;
   a plurality of clock signal lines arranged along a second direction, wherein the clock signal lines are disposed at one side of the GOA units and extending along the first direction, and the second direction is perpendicular to the first direction;
   a plurality of connection lines, each of the connection lines extending along the second direction and connected between one of the clock signal lines and one of the GOA units; and
   a first electrode disposed at one side of the GOA units, the clock signal lines, and the connection lines, wherein the first electrode comprises an opening, the opening is arranged corresponding to the clock signal lines, the connection lines, and the GOA units, and the first electrode is a common electrode,
   wherein horizontal lengths of the connection lines gradually decrease, line widths of at least two of the connection lines gradually increase in a direction that the horizontal lengths of the connection lines gradually decrease, and areas of winding compensation portions of at least two of the connection lines gradually increase in the direction that the horizontal lengths of the connection lines gradually decrease.

2. The display panel according to claim 1, wherein the display panel further comprises:
   an array substrate, wherein the clock signal lines, the GOA units, and the connection lines are disposed on one side of the array substrate; and
   a color filter substrate, wherein the first electrode is disposed on one side of the color filter substrate.

3. The display panel according to claim 2, wherein the display panel comprises a display region and a non-display region surrounding the display region, the non-display region comprises a first border region and a third border region arranged opposite to each other, and a second border region and a fourth border region arranged opposite to each other, the second border region is connected between the first border region and the third border region, and the fourth border region is connected between the first border region and the third border region;
   the display panel comprises two sets of the GOA units, two sets of the clock signal lines, and two sets of the connection lines, two sets of the GOA units, two sets of the clock signal lines, and two sets of the connection lines are disposed on the array substrate and are respectively disposed in the first border region and the third border region, and the first electrode comprises two sets of the openings; and
   the display panel comprises a plurality of common electrode conductive units, the array substrate is disposed corresponding to the color filter substrate, the array substrate comprises a common trace, the common electrode conductive units are disposed between the array substrate and the color filter substrate and disposed in the second border region and the fourth border region, and the common electrode conductive units are electrically connected to the common electrode and the common trace.

4. A display panel, comprising:
   a first clock signal driving line and a second clock signal driving line, wherein an area of the first clock signal driving line is greater than an area of the second clock signal driving line, the first clock signal driving line comprises a first clock signal line and a first connection line, and the second clock signal driving line comprises a second clock signal line and a second connection line;
   a first gate driver on array (GOA) unit and a second GOA unit, wherein the first clock signal driving line is connected to the first GOA unit, and the second clock signal driving line is connected to the second GOA unit; and
   a first electrode, wherein the first electrode is a common electrode; an opening is defined in the first electrode; the opening is arranged corresponding to the first clock signal line, the second clock signal line, the first connection line, the second connection line, the first GOA unit, and the second GOA unit the opening comprises at least two sub-openings overlapping the first clock signal driving line and the second clock signal driving line, respectively the sub-opening overlapping the second clock signal driving line non-overlaps with the first clock signal driving line; and an area of the sub-opening overlapping the first clock signal driving line is greater than an area of the sub-opening overlapping the second clock signal driving line;
   an array substrate, wherein the first clock signal driving line and the second clock signal driving line are disposed in a non-display region of the array substrate;
   a color filter substrate, wherein the color filter substrate is disposed opposite to the array substrate, and the first electrode is disposed on one side of the color filter substrate; and
   wherein horizontal lengths of the connection lines gradually decrease, line widths of at least two of the connection lines gradually increase in a direction that the horizontal lengths of the connection lines gradually decrease, and areas of winding compensation portions of at least two of the connection lines gradually increase in the direction that the horizontal lengths of the connection lines gradually decrease.

5. The display panel according to claim 4, wherein the first connection line is electrically connected to the first clock signal line and the first GOA unit, and the second connection line is electrically connected to the second clock signal line and the second GOA unit;
   wherein the first GOA unit and the second GOA unit are arranged along a first direction, the first clock signal line and the second clock signal line are arranged along a second direction, and the first clock signal line is located at one side of the second clock signal line away from the first GOA unit and the second GOA unit, the first connection line and the second connection line are extended along the second direction, the second direction is perpendicular to the first direction, and a length of the first connection line is greater than a length of the second connection line; and
   the opening is arranged corresponding to the first clock signal line, the second clock signal line, and portions of the first connection line and the second connection line located between the first clock signal line and the second clock signal line.

6. A display device comprising a display panel, wherein the display panel comprises:
   a first clock signal driving line and a second clock signal driving line, wherein an area of the first clock signal driving line is greater than an area of the second clock signal driving line, the first clock signal driving line comprises a first clock signal line and a first connection line, and the second clock signal driving line comprises a second clock signal line and a second connection line;

a first gate on array (GOA) unit and a second GOA unit, the first clock signal driving line is connected to the first GOA unit, and the second clock signal driving line is connected to the second GOA unit; and a first electrode, wherein the first electrode is a common electrode; an opening is defined in the first electrode; the opening is arranged corresponding to the first clock signal line, the second clock signal line, the first connection line, the second connection line, the first GOA unit, and the second GOA unit the opening comprises at least two sub-openings overlapping the first clock signal driving line and the second clock signal driving line, respectively; the sub-opening overlapping the second clock signal driving line non-overlaps with the first clock signal driving line and an area of the sub-opening overlapping the first clock signal driving line is greater than an area of the sub-openings overlapping the second clock signal driving line;

an array substrate, wherein the first clock signal driving line and the second clock signal driving line are disposed in a non-display region of the array substrate;

a color filter substrate, wherein the color filter substrate is disposed opposite to the array substrate, and the first electrode is disposed on one side of the color filter substrate; and wherein horizontal lengths of the connection lines gradually decrease, line widths of at least two of the connection lines gradually increase in a direction that the horizontal lengths of the connection lines gradually decrease, and areas of winding compensation portions of at least two of the connection lines gradually increase in the direction that the horizontal lengths of the connection lines gradually decrease.

7. The display device according to claim 6, wherein the first connection line is electrically connected to the first clock signal line and the first GOA unit, and the second connection line is electrically connected to the second clock signal line and the second GOA unit;

the first GOA unit and the second GOA unit are arranged along a first direction, the first clock signal line and the second clock signal line are arranged along a second direction, and the first clock signal line is disposed at one side of the second clock signal line away from the first GOA unit and the second GOA, the first connection line and the second connection line are extended along the second direction, the second direction is perpendicular to the first direction, and a length of the first connection line is greater than a length of the second connection line; and the opening is arranged corresponding to the first clock signal line, the second clock signal line, and portions of the first connection line and the second connection line between the first clock signal line and the second clock signal line.

* * * * *